United States Patent
Suzuki et al.

(10) Patent No.: US 7,031,070 B2
(45) Date of Patent: Apr. 18, 2006

(54) PLASTIC OPTICAL COMPONENTS

(75) Inventors: Fumiyuki Suzuki, Tokyo (JP); Noriko Eiha, Kanagawa (JP); Tadashi Mochizuki, Kanagawa (JP); Takeo Kido, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/009,095

(22) Filed: Dec. 13, 2004

(65) Prior Publication Data
US 2005/0128600 A1 Jun. 16, 2005

(30) Foreign Application Priority Data
Dec. 12, 2003 (JP) .............................. 2003-414685

(51) Int. Cl.
*G02B 1/00* (2006.01)

(52) U.S. Cl. ...................... 359/642; 359/513; 359/514; 359/515; 359/831; 359/838; 359/885; 359/893; 359/894

(58) Field of Classification Search ................ 359/642, 359/831, 838, 885, 893, 894, 515, 507, 514, 359/513
See application file for complete search history.

(56) References Cited

U.S. PATENT DOCUMENTS

| 5,905,599 A | 5/1999 | Nomura et al. |
| 6,278,554 B1 | 8/2001 | Aratani et al. |

FOREIGN PATENT DOCUMENTS

| EP | 0 580 155 A2 | 1/2004 |
| JP | 11-109107 A | 4/1999 |
| JP | 2000-137166 A | 5/2000 |
| JP | 2002-22903 A | 1/2002 |
| JP | 2002-14802 A | 5/2002 |
| JP | 2002-202401 A | 7/2002 |

*Primary Examiner*—Scott J. Sugarman
*Assistant Examiner*—Darryl J. Collins
(74) *Attorney, Agent, or Firm*—Sughrue Mion, PLLC

(57) ABSTRACT

The plastic optical component includes a main body and a transparent moisture-proof coating provided on all surfaces of the main body, the moisture-proof coating satisfying the following relation (1):

$$(D1/d) \times (L/D2) < 10 \tag{1}$$

where $D1$ (mm²/s) is a water diffusion coefficient of a first material of which the moisture-proof coating is made, $d$ (mm) is a thickness of the first material, $D2$ (mm²/s) is the water diffusion coefficient of a second material of which the main body is made, and $L$ (mm) is an average thickness across an optical surfaces of the second material.

3 Claims, 2 Drawing Sheets

US 7,031,070 B2

PLASTIC OPTICAL COMPONENTS

This application claims priority on Japanese patent application No.2003-414685, the entire contents of which are hereby incorporated by reference. In addition, the entire contents of literatures cited in this specification are incorporated by reference.

FIELD OF THE INVENTION

This invention relates to the technical field of optical components such as lens and prism that are made of plastics, more particularly to plastic optical components that experience extremely small changes in optical performance due to moisture absorption.

Conventionally, camera lenses and a variety of lenses used in finders, copy equipment, printers, projectors and optical communications, as well as optical components including prisms, spectacle lenses, contact lenses and magnifiers are mostly manufactured from glass.

However, with the recent progress in plastic materials and in the plastics molding technology, it has become possible to manufacture lenses, prisms and other optical components at low cost using plastics which are made from cheap materials, lightweight and suitable for mass production.

The problem with plastics is that their optical performance parameters such as refractive index will change upon moisture absorption, so glass is still employed in uses that require high precision (i.e., high resolution) as exemplified by lenses in high-end SLR cameras.

With a view to solving this problem, attempts are being made to develop plastic materials having high moisture barrier quality, namely, low hygroscopicity by various approaches such as designing special polymer structures. However, the cost of such attempts is so high as to sacrifice the economical advantage of plastics themselves.

In order to make optical components of high moisture barrier quality from plastics, it is currently practiced to add hydrophobic substances at stages such as molding of an optical component, or cover it with a barrier film impervious to moisture, or provide an anti-reflection film on the optical component and cover its top surface with a coating layer that is subsequently rendered water- and oil-repellant (see JP 2002-148402A).

It is also known to improve the moisture stability of a plastic optical component by forming a hygroscopicity adjusting film only in an area from which a gate has been removed (see JP 11-109107A).

Another approach that is in current practice is fitting an optical system with at least one optical block made of a low-hygroscopicity material to ensure that changes in the performance of the optical system upon moisture absorption are optically compensated (see JP 2000-137166A).

However, the moisture-proof plastic optical component made by the above-described prior art method and the plastic optical component described in JP 2002-148402A which has the barrier film and the anti-reflection layer covered with the water- and oil-repellant coating layer are incapable of securing satisfactory moisture barrier quality and hence have had the disadvantage of failing to prevent refractive index and other optical performance parameters from changing upon moisture absorption.

According to the technology described in JP 11-109107A, the hygroscopicity adjusting film is provided only in the area where the gate has been removed but it is substantially difficult to ensure that the rate of moisture absorption from the surrounding areas is held constant and this difficulty, combined with moisture absorption from the surface, has caused such a problem that the refractive index distribution inside the lens unavoidably becomes optically undesirable or uneven.

The problem with the technology described in JP 2000-137166A is that it provides a complex and costly optical system.

SUMMARY OF THE INVENTION

An object, therefore, of the present invention is to solve the aforementioned problems of the prior art by providing plastic optical components which, in addition to the superior characteristics of plastic optical components themselves such as lightweightness, low cost and suitability for mass production, exhibit superior moisture barrier quality while experiencing extremely small changes in refractive index and other optical performance parameters even if they are subject to the effect of water in the environment.

In order to attain the stated object, the present inventors made intensive studies on the changes that would occur to the optical performance of plastic optical components due to moisture absorption. As a result, they found that the changes in the optical performance of plastic lenses due to moisture absorption were mainly attributable to the unevenness in refractive index distribution caused by the marked unevenness in the distribution of water content inside the lens during the process of moisture absorption or moisture removal. The present invention has been accomplished on the basis of this finding.

In order to attain the above-mentioned object, the present invention provides a plastic optical component comprising: a main body; and a transparent moisture-proof coating provided on all surfaces of said main body, said moisture-proof coating satisfying the following relation (1):

$$(D1/d) \times (L/D2) < 10 \qquad (1)$$

where $D1$ (mm$^2$/s) is a water diffusion coefficient of a first material of which said moisture-proof coating is made, $d$ (mm) is a thickness of the first material, $D2$ (mm$^2$/s) is the water diffusion coefficient of a second material of which said main body is made, and $L$ (mm) is an average thickness across an optical surfaces of the second material.

Preferably, said moisture-proof coating is a glassy film made of Silicon Oxide.

Preferably, said moisture-proof coating is a vinylidene chloride film.

According to the present invention, there is offered the advantage of easily realizing and providing plastic optical components which retain the superior characteristics of plastic optical components themselves such as lightweightness, low cost and suitability for mass production and which still exhibit superior moisture barrier quality while experiencing extremely small changes in refractive index and other optical performance parameters even if they are subject to the effect of moisture in the environment.

DESCRIPTION OF THE PREFERRED EMBODIMENT

The plastic optical component of the invention is described below in detail with reference to the preferred embodiment shown in the accompanying drawings.

Figure 1A:
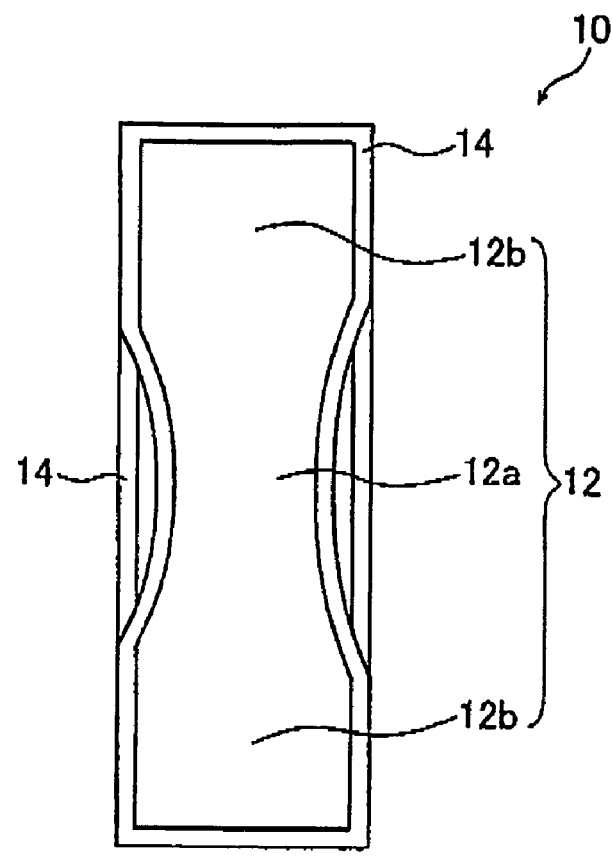
FIG. 1A is a sectional view showing in concept an example of the plastic optical component of the invention.
Figure 1B:
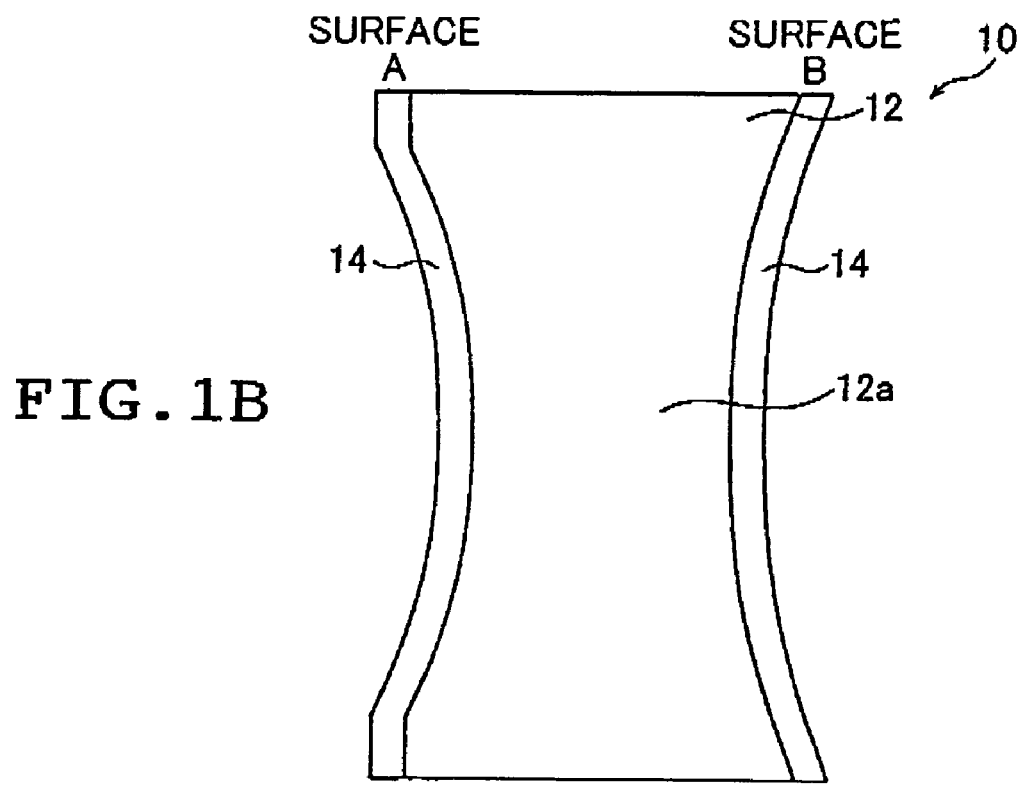
FIG. 1B is an enlarged sectional view showing in concept the lens portion of the plastic optical component described in FIG. 1A.

FIGS. 1A and 1B show in concept an example of the plastic optical component of the invention.

The plastic optical component (hereunder sometimes referred to simply as the optical component) which is indicated by 10 in FIG. 1A is characterized in that it applies the concept of the invention to a lens element and it comprises its main body (hereunder referred to simply as the main body) 12 and a clear moisture-proof coating 14 formed on top of the main body 12.

The main body 12 is an ordinary plastic lens, or a lens made of plastics, and comprises a lens portion 12a and an outer flange portion 12b. The lens portion 12a is shown enlarged in FIG. 1B.

The main body 12 as part of the optical component 10 of the invention is not limited to the illustrated case of a plastic lens; as long as it is made of plastics, the main body 12 may be chosen not only from among lenses having various other shapes and functions but also from among other optical elements including prisms, optical filters, optical screens, deflectors, polarizers, light reflecting members, finders, glasses, contact lenses, reflectors and curved mirrors, as well as from among known optical elements including a variety of members and components that exhibit optical functions either as used independently or as assembled into imaging optical systems for use in imaging devices such as cameras (e.g., silver halide camera, digital camera and video camera), image forming apparatuses such as copiers and printers, and various other optical equipment including projectors, telescopes, binoculars and magnifiers.

Hence, it goes without saying that the plastic optical component of the invention is to be employed as optical elements having the above-described various functions.

There is also no limitation on the material of which the main body 12 is formed and a variety of plastic materials (resin materials) used in known optical elements and ordinary optical components may be employed. To mention a few examples, methacrylic resins (e.g., PMMA), acrylic resins, polycarbonate resins, aromatic polyester resins, polystyrene resins, acrylonitrile-styrene (AS) resins, resins containing the tricyclodecane ring, cycloolefinic polymers, poly (methylpentene), styrene-butadiene copolymers, polyesters having a fluorene group, and cycloolefinic resins.

In particular, if one wants achromatism in an imaging optical system, at least two materials are required that have different dispersion characteristics. One of them is a material for which cycloolefinic resins can be candidates; upon moisture absorption, cycloolefinic resins experience small changes in refractive index and suffer small optical distortion; their Abbe number is about 55. From an optical design viewpoint, this material is suitably combined with polycarbonate resins or aromatic polyester resins which have Abbe numbers of about 30.

The method of forming the main body 12 also is not limited in any particular way and depending on the plastic material to be used, all known plastics molding techniques including injection molding, injection compression molding and compression molding may be adopted.

The shape and size (length, diameter and thickness) of the main body 12 also are not limited in any particular way and may be chosen as appropriate depending on the use of the optical component under consideration.

In the illustrated case of the optical component 10, the main body 12 has the clear moisture-proof coating 14 provided in such a way as to cover its entire surface.

For the purposes of the present invention, the moisture-proof coating 14 needs to satisfy the following relation (1):

$$(D1/d) \times (L/D2) < 10 \tag{1}$$

Although $(D1/d) \times (L/D2)$ must be less than 10, it is preferably 5 or less, more preferably 2 or less.

In relation (1), D1 (mm$^2$/s) represents the water diffusion coefficient of the material of which the moisture-proof coating 14 is made, d (mm) is the thickness of that material, D2 (mm$^2$/s) is the water diffusion coefficient of the material of which the main body 12 is made, and L (mm) is the average thickness across the optical surfaces of the material of which the main body 12 is made; in the illustrated case, L (mm) is the average thickness of the lens portion 12a as measured between the optical surfaces of the lens.

In the present invention, D1/d, or the ratio between D1 (mm$^2$/S) which is the water diffusion coefficient of the material of which the moisture-proof coating 14 is made and d (mm) which is the thickness of that material, may be determined by the following procedure: a flat sheet of sample is prepared from the same material as the material of which the main body 12 is made; this sample is provided with a desired moisture-proof coating 14 to prepare a sample with moisture-proof coating; the rate of moisture absorption is measured on this sample in accordance with JIS K7209 (equivalent to ISO 62); the rate of moisture absorption is also measured on a flat sheet of sample having no moisture-proof coating; and the difference between the two values of moisture absorption rate is calculated to determine D1/d.

To determine D2 (mm$^2$/S), or the water diffusion coefficient of the material of which the main body 12 is made, a flat sheet of sample is prepared from the same material as the material of which the main body 12 is made and the method described in JIS K7209 (equivalent of ISO 62) is applied to this sample.

The value of L (mm) which represents the average thickness across the optical surfaces of the material of which the main body 12 is made may be determined accurately from the shapes and sizes of the optical surfaces, or the optically acting surfaces, of the material of which the main body 12 is made. However, in the case of an optical element such as a lens which is characterized by a constant change in shape, L may be determined as the arithmetic mean of the maximum and minimum thicknesses across the optical surfaces of the material of which the main body 12 is made; in the illustrated case, L may be determined as the arithmetic mean of the maximum and minimum thicknesses of the lens portion 12a.

The moisture-proof coating 14 acts as an excellent moisture-proof film by being provided over all surfaces of the main body 12 and by satisfying the foregoing relation (1). Even if the main body 12 is made of a hygroscopic material, the coating 14 exhibits superior moisture barrier quality; should the main body 12 absorb moisture or moisture be removed from the main body 12 on account of the water in the environment, the distribution of water content inside the main body 12 will not become uneven and, hence, there will be no deterioration in its optical performance as exemplified by unevenness as in its refractive index distribution; hence, there will be extremely small changes in the characteristics of the main body 12, namely, in its optical performance such as refractive index, on account of the water content in the environment.

Consequently, the optical component 10 of the present invention which has all surfaces of the main body 12 covered with such moisture-proof coating 14 exhibits excellent moisture barrier quality (moisture resistance) and even if it absorbs moisture upon exposure to a humid environment, there will be no appreciable unevenness in the distribution of water content inside the main body 12, causing extremely small changes in its optical performance on account of the water in the environment.

In the optical component 10 of the present invention, the purpose of the moisture-proof coating 14 is not for completely preventing the water in the environment from being absorbed into or removed from the main body 12 and even if such moisture absorption or removal takes place through the moisture-proof coating 14, the objects of the invention can be attained as long as the optical component 10 can function with extremely small changes occurring to its optical performance on account of the water in the environment. However, in order to satisfy this need, it is necessary that the moisture-proof coating 14 be provided on all surfaces of the main body 12 including not only the lens portion 12a but also the flange portion 12b, as shown in FIG. 1A.

Here, the moisture-proof coating 14 is limited to one that satisfies the relation (1) because if this relation is not satisfied, any absorption of moisture into the main body 12 or its removal therefrom through the moisture-proof coating 14 will cause an extreme unevenness in the distribution of water content inside the main body 12 of a plastic lens element or the like, in particular, the lens portion 12a during the process of moisture absorption or moisture removal, and on account of this marked unevenness in the water content, uneven distribution of refractive index occurs inside the main body 12 of a plastic lens element or the like, in particular, the lens portion 12a, and the main body 12 undergoes increasing changes in optical performance due to moisture absorption or removal, eventually leading to deteriorated optical performance of the optical component 10.

In addition, the moisture-proof coating 14 needs to be provided on all surfaces of the main body 12; if the surface of the main body 12 is not covered in some areas with the moisture-proof coating 14, the discontinuities in the coverage of the moisture-proof coating 14 will increase the difference in the degree of moisture absorption into or moisture removal from the main body 12, creating an extreme unevenness in the distribution of water content, hence, uneven index distribution inside the main body 12 and, as a result, the main body 12, hence, the optical component 10 will undergo increased changes in optical performance.

The value of d, or the thickness of the moisture-proof coating 14, is not limited in any particular way and as long as the above-described moisture barrier effect is attained, it may be set as appropriate for the nature of that coating in such a way that the relation (1) is satisfied. The preferred range of the thickness d of the moisture-proof coating 14 that varies with its nature will be described later.

The optical component 10 of the present invention has the main body 12 such as the lens element covered with the moisture-proof coating 14 having the features described above. Hence, if only film deposition is possible, a variety of materials (plastic materials) for the main body 12 having different optical characteristics may be employed to fabricate various types of optical component 10 having superior moisture barrier quality; for example, the concept of the invention can be applied to lens manufacture and lenses of different optical characteristics may be combined to realize an imaging optical system that exhibits superior moisture barrier quality and which assures high precision as exemplified by the absence of chromatic aberration.

Here, as long as the relation (1) is satisfied, the moisture-proof coating 14 may be single- or multi-layered. If it is single-layered, the moisture-proof coating 14 may be inorganic or organic. The same applies to the case of a multi-layered coating and it may be inorganic or organic or a combination of an inorganic and an organic film. In the case where the moisture-proof coating 14 is multi-layered, it goes without saying that the water diffusion coefficient D1 and the thickness d refer to the respective values for the multi-layered structure taken as a whole.

In the optical component 10 of the present invention, the inorganic film which constitutes the single-layered structure of the moisture-proof coating 14 or which is employed as one of the layers in the moisture-proof coating 14 or as part of the multi-layered composite structure of that coating 14 is not limited in any particular way and a variety of thin films that are based on inorganic materials can be employed as long as they have sufficient transparency and show low or no moisture permeability.

Suitable inorganic materials include, for example, silicon oxides such as $SiO_2$ and SiO, $ZrO_2$, $TiO_2$, TiO, $Ti_2O_3$, $Al_2O_3$, $Ta_2O_5$, $CeO_2$, MgO, $Y_2O_3$, $SnO_2$, $MgF_2$, $WO_3$, and a mixture consisting of an In/Sn mixed oxide.

Whichever of these materials are chosen, the inorganic film preferably has the densest possible structure and absorbs less of the intended wavelengths of light.

Here, in the case of employing an inorganic film in the moisture-proof coating 14, it is preferably a glassy film made of silicon oxide. Stated more specifically, if an inorganic film constitutes the single-layered structure of the moisture-proof coating 14 or if it is employed as one of the layers in the moisture-proof coating 14 or as part of the multi-layered composite structure of that coating 14, it is particularly preferred that such an inorganic film is a glassy film made of silicon oxide.

Further speaking of the case where an inorganic film is employed in the moisture-proof coating 14, the thickness of the inorganic film is not limited to any particular value as long as the thickness of the moisture-proof coating 14 satisfies the relation (1) and, in accordance with the composition of that inorganic film or depending upon whether it is employed as the sole element of a single-layered structure or as one of the layers in a multi-layered structure or whether it is combined with an organic film to make a multi-layered composite structure, the thickness may be set at an appropriate value that can assure the required transparency and which can exhibit the desired moisture barrier quality.

If an inorganic film is employed in the moisture-proof coating 14, its thickness preferably ranges from 10 nm to 1,000 nm (1 μm). These values particularly refer to the thickness of the inorganic film which is the sole element of a single-layered structure or which accounts for all elements in a multi-layered structure; alternatively, they refer to the total thickness of all inorganic layers in a multi-layered composite structure with organic films. If the thickness of the inorganic film or films is within the stated range, there will be only a few pinholes that affect the moisture barrier quality. To state more specifically, the reason for limiting the thickness of the inorganic film or films to lie within the stated range is as follows: at thicknesses smaller than 10 nm, pinholes may potentially occur and at thicknesses greater than 1,000 nm, the inorganic film or films make no further contribution to the purpose of moisture prevention; on the contrary, an increased thickness will lower the production rate, particularly in the case of dry film deposition, and residual stress will increase the chance of cracking.

The method of forming the inorganic film or films is not limited in any particular way and one can employ a variety of dry processes such as vacuum evaporation, sputtering, ion plating and CVD (chemical vapor deposition), as well as a variety of wet processes including the sol-gel method. A suitable method may be chosen as appropriate for the composition of the inorganic film to be formed, its thickness, and other factors. It is particularly preferred that the thickness of inorganic films to be formed by dry processes is within the above-mentioned range of 10 nm to 1 µm since the reasons already given for the criticality of that range hold true with greater validity.

There is also no limitation on the method of applying solutions in the case of employing wet processes such as the sol-gel method and a variety of coating methods can be employed, including dip coating, spray coating and spin coating. For advantages such as the ease with which coating solutions can be applied to the entire surface of the main body 12 to form the desired inorganic layer, dip coating may be mentioned as a preferred example.

If the sol-gel method is adopted, inorganic films can be formed by, for example, hydrolyzing alkoxysilane compounds. Alternatively, commercial products may be employed and an example is SolGard™ of Nippon Dacro Shamrock Co., Ltd.

In the optical component 10 of the present invention, the organic film which constitutes the single-layered structure of the moisture-proof coating 14 or which is employed as one of the layers in the moisture-proof coating 14 or as part of the multi-layered composite structure of that coating 14 is not limited in any particular way and a variety of thin films that are based on organic materials can be employed as long as they have sufficient transparency and show low or no moisture permeability.

Suitable organic films include, for example, films based on poly(vinylidene chloride) and vinylidene chloride/vinyl chloride copolymer, films based on cycloolefinic resins such as ZEONEX™ of ZEON Corporation, films based on amorphous fluoropolymers such as CYTOP™ of Asahi Glass Co., Ltd. and Teflon (registered trademark) AF of DuPont, films based on fluoropolymers such as Novec™ of Sumito 3M Limited, and films based on silicone resins such as Shin-Etsu Silicone KR251, KR400 and KR114A of Shin-Etsu Chemical Co., Ltd.

Here, in the case of employing an organic film in the moisture-proof coating 14, it is preferably a vinylidene chloride layer. Stated more specifically, if an organic film constitutes the single-layered structure of the moisture-proof coating 14 or if it is employed as one of the layers in the moisture-proof coating 14 or as part of the multi-layered composite structure of that coating 14, it is particularly preferred that such an organic film is a vinylidene chloride film.

Further speaking of the case where an organic film is employed in the moisture-proof coating 14, the thickness of the organic film is not limited to any particular value as long as the thickness of the moisture-proof coating 14 satisfies the relation (1) and, in accordance with the composition of that organic film or depending upon whether it is employed as the sole element of a single-layered structure or as one of the layers in a multi-layered structure or whether it is combined with an inorganic film to make a multi-layered composite structure, the thickness may be set at an appropriate value that can assure the required transparency and which can exhibit the desired moisture barrier quality.

If an organic film is employed in the moisture-proof coating 14, its thickness preferably ranges from 100 nm to 10,000 nm (10 µm). These values particularly refer to the thickness of the organic film which is the sole element of a single-layered structure or which accounts for all elements in a multi-layered structure; alternatively, they refer to the total thickness of all organic films in a multi-layered composite structure with inorganic films. If the thickness of the organic film or films is within the stated range, there will be only a few pinholes that affect the moisture barrier quality. To state more specifically, the reason for limiting the thickness of the organic film or films to lie within the stated range is as follows: at thicknesses smaller than 100 nm, there is an increased chance for the occurrence of pinholes and at thicknesses greater than 10 µm, the organic film or films make no further contribution to the purpose of moisture prevention; on the contrary, an extremely thick film tends to become uneven in thickness, leading to reduced optical performance.

It should further be mentioned that the organic film preferably has good transmission of light rays and low refractive index as its optical characteristics. Low refractive index results in low loss due to surface reflection of incident light, eventually leading to better transmittance of light rays. By appropriate optical design, the moisture-proof coating of the present invention can also be adapted to have additional features such as anti-reflection and hard coat.

The method of forming the organic film or films is not limited in any particular way and one can employ a variety of wet processes such as a method comprising the steps of preparing a coating solution having the film forming resin component dissolved or dispersed therein, applying the coating solution and drying the applied film, as well as a variety of dry processes such as plasma polymerization and CVD. A suitable method may be chosen as appropriate for the composition of the organic film to be formed, its thickness, and other factors.

In the case of wet processes which employ coating solutions, there is no limitation on the method of applying coating solutions and a variety of methods can be employed, including spray coating, brush coating and dip coating. For the same reason as given in connection with the inorganic film, namely, for advantages such as the ease with which coating solutions can be applied to the entire surface of the main body 12 to form the desired organic film, dip coating may be mentioned as a preferred example.

It is particularly preferred that the thickness of organic films to be formed by wet processes is within the above-mentioned range of 100 nm to 10 µm since the reasons already given for the criticality of that range in connection with the thickness of the organic film or films in the moisture-proof coating 14 hold true with greater validity.

If a composite structure consisting of an inorganic film and an organic film is used as the moisture-proof coating 14 of the present invention, the surface of a previously formed inorganic film may optionally be treated, as by application of an anchor coat, in order to enhance its adhesion to a subsequently formed organic film.

In the optical component 10 of the present invention, the thickness of the moisture-proof coating 14, namely, the thickness of the inorganic film and/or organic film which constitutes the moisture-proof coating is most preferably uniform throughout. However, the present invention is by no means limited to this particular case and as long as the coating is provided over the entire surface to ensure sufficient moisture resistance that there will not be uneven distribution of the water content inside the main body 12, particularly the lens portion 12a, the thickness of the moisture-proof coating 14 need not necessarily be uniform. To the extent that the desired moisture resistance is obtained, it basically suffices that only the optically acting region such as the lens portion 12a has a predetermined thickness of the moisture-proof coating 14 that is appropriate for particular optical characteristics and one may adopt other designs such as where the moisture-proof coating 14 in edge and end regions such as the flange portion 12b which are not responsible for the transmission of light rays is thicker or thinner than in the other regions. Even the thickness of the moisture-proof coating 14 in the optically acting region such as the lens portion 12a need not necessarily be uniform and it may have a certain amount of thickness profile as long as it is appropriate for the required optical characteristics. If the moisture-proof coating 14 has a thickness profile, its thickness d (mm) preferably describes the average thickness of the moisture-proof coating 14 for the optically acting region.

In the present invention, the moisture-proof coating 14 will develop particularly superior moisture barrier quality if it has a multi-layered structure employing an inorganic film and an organic film in combination. While the reason for this is not clear, it may be theorized that the inorganic film and the organic film, which are applied or deposited by different mechanisms from different compositions, cooperate to make up or compensate for the defects the other film has and, at the same time, the moisture resisting properties of the respective films develop synergistically to exhibit outstanding moisture resistance.

Generally, inorganic films are hard and involve lots of pinholes, cracks and other defects; on the other hand, organic films have a certain degree of elasticity. Therefore, in the case of employing a dual-layered structure in the moisture-proof coating 14, one may provide an inorganic film in the lower layer and an organic film in the upper layer; by so doing, the pinholes and other defects in the inorganic film are effectively filled by the organic film to eventually form a defect-free film, thereby developing extremely high moisture barrier quality making the most of the inherently high moisture barrier quality of the inorganic film. In addition, the elastic organic film works as a protective film that protects the inorganic film from external stress or against thermal or otherwise induced expansion/contraction of the main body 12; consequently, the strength of the moisture-proof coating 14 is sufficiently assured that it exhibits satisfactory moisture resisting property over an extended period.

While the plastic optical component of the present invention has been described in detail with reference to a particular embodiment, the present invention is by no means limited to that particular embodiment and it should be noted that various improvements and modifications are of course possible without departing from the scope and spirit of the invention.

For instance, in the foregoing embodiment, the moisture-proof coating 14 is directly formed on top of the main body 12 but this is not the sole case of the invention and an intermediate film such as an index adjusting film, an anti-reflection film or an adhesion enhancing film may be provided between the main body 12 and the moisture-proof coating 14. If desired, the moisture-proof coating 14 may be covered with an overcoat such as an anti-reflection film, an index adjusting film, an adhesion enhancing film or a damage preventing barrier film. In short, as long as all surfaces of the main body 12 are covered with the moisture-proof coating 14, the plastic optical component of the present invention may employ a variety of films or coats to realize various layer arrangements.

On the following pages, the plastic optical component of the invention is described in further detail by means of specific examples.

Figure 2:
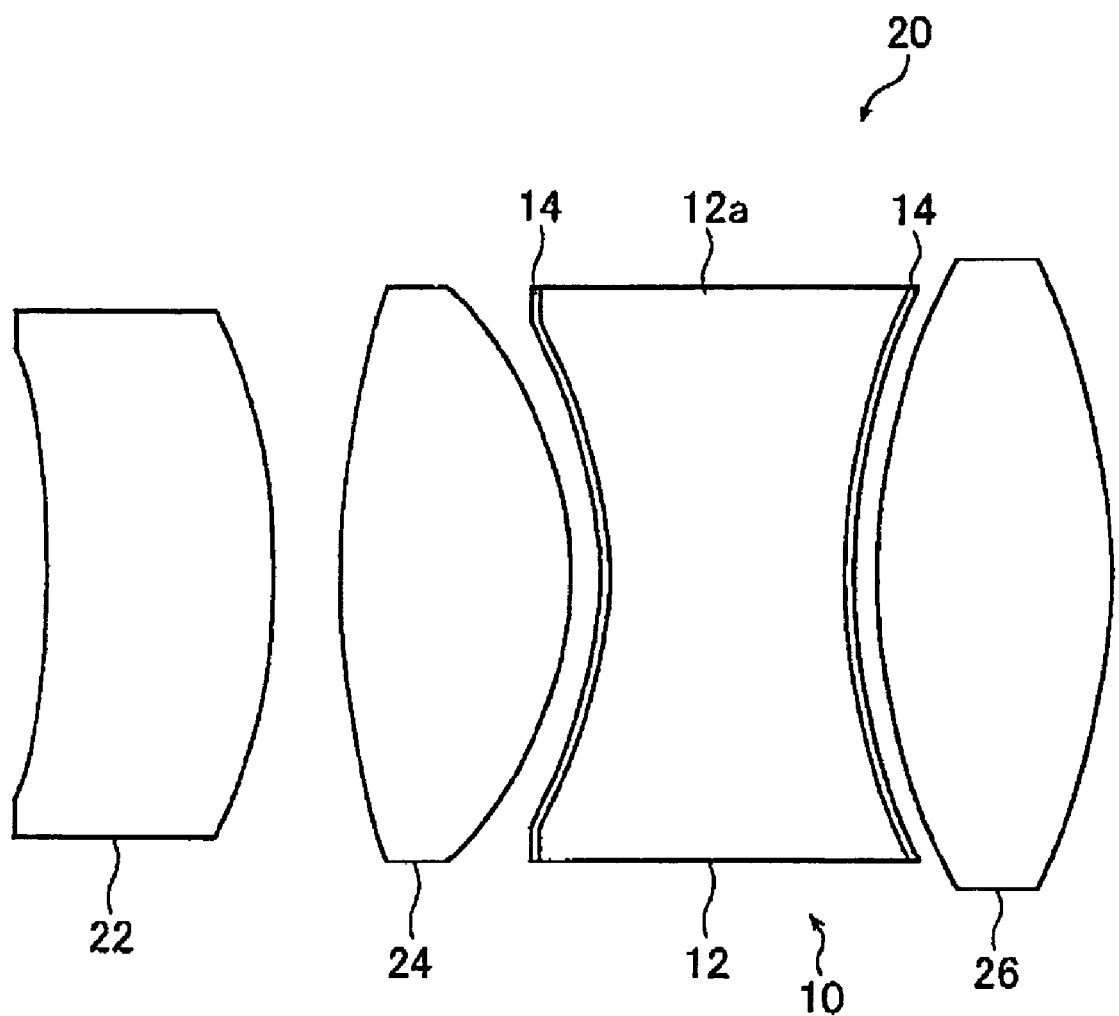
FIG. 2 is a sectional view showing in concept a configuration of a lens unit that employs the plastic optical component depicted in FIGS. 1A and 1B according to the example of the invention.

In order to evaluate the optical performance of the plastic optical component of the invention, an optical unit having the lens configuration shown in FIG. 2 was employed.

The optical unit indicated by 20 in FIG. 2 consists of four lens elements which comprise, in order from the entrance side, lens 22, lens 24, the optical component 10 of the invention as a lens, and lens 26. Light emerges from the lens 26. As in FIG. 1B, only the lens portion 12a of the optical component 10 is shown in FIG. 2 but in practice it has the flange portion 12b as shown in FIG. 1A. Although not shown, each of the lenses 22, 24 and 26 has a flange portion.

In the illustrated case, the lenses 22, 24 and 26 are made of ZEONEX™ of ZEON Corporation, and the optical component 10 is made of a polycarbonate resin.

The resolving power of the optical (lens) unit 20 was measured after it was left in an environment of 25° C. and 30% RH for one week; the MTF (modulation transfer function) at 50% contrast was 160 lines/mm at the center of the axis and 75 lines/mm in the periphery on the average.

ZEONEX™ of which the lenses 22, 24 and 26 were made are known to absorb such a small quantity of moisture that it is substantially free from changes in optical performance due to moisture. Hence, the moisture-proof coating 14 was provided only on the main body 12 which was made of a hygroscopic polycarbonate resin and the optical component 10 of the present invention was fabricated as will be described later in Examples 1 and 2. The moisture-proof coating 14 was formed on the entire surface of the main body 12 by either sputtering or application of a coating solution or the combination of these two methods.

Described below are the shapes and sizes of the lens portion 12a of the main body 12 employed in the Examples, as well as those of its optical surfaces.

The lens portion 12a of the main body 12 shown in FIG. 1B has a diameter of 2.00 mm and the thickness of its lower end is 1.185 mm, with the shapes of its optical surfaces being defined by the respective coefficients in the following expression of the asphere (2):

$$z = \frac{cVr^2}{1 + \sqrt{1 - cV^2(cc+1)r^2}} + as0 + as1H + as2H^2 + as3H^3 + as4H^4 + \ldots + as10H^{10} \quad (2)$$

$$H = \sqrt{x^2 + y^2}$$

where z is the shape of an optical surface, cv is the curvature (mm) of a reference spherical surface, cc is the conic constant (mm), and r is the distance (mm) from the center of a reference sphere.

Table 1 lists the values of the coefficients that define the shapes of two optical surfaces, A and B, of the lens portion 12a shown in FIG. 1B.

TABLE 1

|    | Surface A | Surface B |
|----|-----------|-----------|
| cv | −1.225    | 2.375     |
| cc | −0.150    | 0         |

TABLE 1-continued

|     | Surface A | Surface B |
| --- | --- | --- |
| as0 | 0 | 0 |
| as1 | 0 | 0 |
| as2 | −0.0026 | 0 |
| as3 | 0 | 0 |
| as4 | 0.1147 | 0 |
| as5 | 0 | 0 |
| as6 | −0.0479 | 0 |
| as7 | 0 | 0 |
| as8 | 0.0878 | 0 |
| as9 | 0 | 0 |
| as10 | −0.0088 | 0 |

The main body 12 shown in FIG. 1A had the following dimensions: the diameter of the flange portion 12b was 3.79 mm; its thickness (maximum thickness of the lens portion 12a) was 1.185 mm; the thickness at the center of the lens portion 12a (its minimum thickness) was 0.79 mm; the diameter of the curved optical surface A was 1.74 mm; the diameter of surface B was 2.00 mm.

The lens unit 20 incorporating the optical component 10 which had the moisture-proof coating 14 applied to the main body (lens) 12 was left in an environment of 25° C. and 30% RH for one week and thereafter transferred to an environment of 25° C. and 90% RH, where resolving power measurement was conducted at day 2, day 5 and day 10.

The main body 12 of the optical component 10 had an average thickness L of 1.00 mm and the material it was made of had a water diffusion coefficient D2 of $5 \times 10^{-6}$ mm$^2$/sec.

EXAMPLE 1

A polycarbonate lens having the above-described shape and size was prepared as the main body 12 of an optical component by injection molding.

By sputtering, a moisture-proof coating 14 made of Si and O was deposited in a thickness of about 100 nm on all surfaces of the main body 12 to fabricate the optical component 10 of the present invention. The sputter target was a silicon plate. During sputtering, Ar was introduced at the time the pressure reached $7 \times 10^{-4}$ Pa and electric discharge was performed at 0.3 Pa for 5 minutes to effect plasma treatment on the lens surfaces of the main body 12. Subsequently, the Si target was pre-sputtered for 3 minutes. Thereafter, the discharge power was increased 4-fold and with O$_2$ being introduced as a reactive gas, the main body 12 which was the polycarbonate lens was subjected to deposition treatment at 0.3 Pa until a clear moisture-proof coating 14 formed in a thickness of 100 nm.

The thus obtained optical component 10 of Example 1 consisted of the main body 12 and the moisture-proof coating 14 and it was assembled into the lens unit 20.

EXAMPLE 2

A polycarbonate lens was fabricated as in Example 1 to make the main body 12. To all surfaces of this main body 12, an undercoating agent (WS-5000; product of Mitsui Takeda Chemicals, Inc.) was applied and dried at 80° C. for 30 minutes. Subsequently, a vinylidene chloride latex (L551B; product of ASAHI KASEI CORP.) was applied and dried at 110° C. for 30 minutes. Thereafter, the substrate was left to stand at 35° C. for 2 days until a clear moisture-proof coating 14 formed. The overall thickness of the moisture-proof coating 14 including the undercoat was 8 μm.

The thus obtained optical component 10 of Example 2 consisted of the main body 12 and the moisture-proof coating 14 and it was assembled into the lens unit 20.

Comparative Example 1

A polycarbonate lens was fabricated as in Example 1 to make the main body 12. In place of the optical component 10 of the present invention, this main body 12 was directly assembled into the lens unit 20 as the optical component of Comparative Example 1 which was an untreated lens.

Comparative Example 2

A polycarbonate lens was fabricated as in Example 1 to make the main body 12. To all surfaces of this main body 12, isopropyl alcohol and CYTOP™ primer CT-P10 (Asahi Glass Co., Ltd.) diluted with isobutyl acetate were applied as undercoating agents for depositing a fluoropolymer film. After drying the applied undercoat, a fluoropolymer CYTOP™ CTL-110A was applied and dried at 120° C. for 2 hours to form a clear film 5 μm thick that was made of the fluoropolymer. The thus obtained optical component of Comparative Example 2 was substituted for the optical component 10 of the present invention and assembled into the lens unit 20.

Comparative Example 3

A polycarbonate lens was fabricated as in Example 1 to make the main body 12. A SiO moisture-proof coating 14 which was of the same quality as what was prepared in Example 1 was formed on two opposed surfaces A and B of the lens portion 12a of the main body 12 but the end faces and the two opposed surfaces A and B of the flange portion 12b were left untreated. The thus obtained optical component of Comparative Example 3 was substituted for the optical component 10 of the present invention and assembled into the lens unit 20.

Evaluation of Moisture Barrier Quality

On polycarbonate sheets measuring 150 mm×150 mm×1 mm, the moisture-proof coatings 14 of Examples 1 and 2 and those of Comparative Examples 2 and 3 were formed. These sheets (equivalents of optical component) and an untreated sheet (equivalent of optical component) were dried in a desiccator at 50° C. for 7 days and transferred into a thermo-hygrostatic chamber at 90% RH and 25° C. to determine the rate of weight increase due to moisture absorption. From the data for the untreated optical component, D2 was determined by JIS K7209 and then D1/d was calculated from the difference between the rate of moisture absorption on the untreated optical component and the rate of moisture absorption on each of the treated optical components. For the sheets of sample employed in the test, (D1/d)×(L/D2) was determined on the assumption of L=1.00 mm.

The polycarbonate of which the main body 12 was made in Examples 1 and 2 and in Comparative Examples 2 and 3 had a value of $5 \times 10^{-6}$ mm$^2$/sec as D2.

The thus determined values of (D1/d)×(L/D2) are listed in Table 2.

TABLE 2

|  | (D1/d) × (L/D2) |
|---|---|
| Example 1 | 5 |
| Example 2 | 2 |
| Comparative Example 2 | 20 |
| Comparative Example 3 | 5 |

As is clear from Table 2, the samples of Examples 1 and 2 and Comparative Example 3 satisfy the relation (1) but the sample of Comparative Example 2 does not. Although the sample of Comparative Example 3 satisfies the relation (1), the moisture-proof coating 14 is not provided on all surfaces of the main body 12.

Evaluation of Optical Performance

The respective lenses (optical components) were thoroughly dried in a desiccator at 50° C. for 7 days. Each of these dried lenses (optical components) was assembled into a lens barrel (not shown) together with three other ZEONEX lenses 22, 24 and 26 to construct the lens unit 20. The individual lenses were finely adjusted in both orientation and lens-to-lens distance to have specified values of resolving power. The lenses were then placed under conditions of 90% RH and 25° C. to measure time-dependent changes in the resolving power. Using an MTF meter of TRIOPTICS GmbH, resolving power was measured as MTF at 50% contrast. The peripheral resolving power was expressed by MTF as averaged for tangential and sagittal directions.

The results of resolving power measurements are shown in Table 3.

TABLE 3

|  | Resolving power | Start | Day 2 | Day 5 | Day 10 |
|---|---|---|---|---|---|
| Example 1 | Center | 170 | 169 | 170 | 170 |
|  | Peripheral | 35 | 35 | 34 | 35 |
| Example 2 | Center | 169 | 170 | 170 | 170 |
|  | Peripheral | 34 | 35 | 34 | 35 |
| Comparative Example 1 | Center | 170 | 162 | 165 | 170 |
|  | Peripheral | 35 | 32 | 33 | 35 |
| Comparative Example 2 | Center | 170 | 165 | 162 | 168 |
|  | Peripheral | 34 | 33 | 30 | 33 |
| Comparative Example 3 | Center | 170 | 141 | 134 | 150 |
|  | Peripheral | 35 | 28 | 25 | 30 |

As is clear from Table 3, the results of Examples 1 and 2 were satisfactory since the lens unit 20 suffered only minimal changes, or drops, in the center and peripheral resolving power even when days passed from the start point.

On the other hand, in Comparative Examples 1 and 2, the central and peripheral resolving powers of the lens unit 20 returned or almost returned to the initial levels when as many as 10 days had passed; however, at days 2 and 5, the central and peripheral resolving powers of the lens unit 20 experienced noticeable drops from the initial levels.

In Comparative Example 3, there was some recovery when as many as 10 days passed but at every period of test, the central and peripheral resolving powers of the lens unit 20 experienced marked drops from the initial levels.

Obviously, the optical components (lenses) of Examples 1 and 2 which were covered with the moisture-proof coating 14 on all surfaces of the main body 12 experienced very small changes or drops in resolving power after moisture absorption as compared with the optical components (lenses) of Comparative Examples 1, 2 and 3; in other words, the optical components of the present invention exhibit outstanding moisture barrier quality and suffer extremely small changes in characteristics, particularly in optical performance in spite of the environmental moisture.

One can therefore appreciate the beneficial effect of the present invention from the above Examples.

What is claimed is:

1. A plastic optical component comprising:
   a main body; and
   a transparent moisture-proof coating provided on all surfaces of said main body, said moisture-proof coating satisfying the following relation (1):

$$(D1/d) \times (L/D2) < 10 \tag{1}$$

where D1 ($mm^2/s$) is a water diffusion coefficient of a first material of which said moisture-proof coating is made, d (mm) is a thickness of the first material, D2 ($mm^2/s$) is the water diffusion coefficient of a second material of which said main body is made, and L (mm) is an average thickness across an optical surfaces of the second material.

2. The plastic optical component according to claim 1, wherein said moisture-proof coating is a glassy film made of Silicon Oxide.

3. The plastic optical component according to claim 1, wherein said moisture-proof coating is a vinylidene chloride film.

* * * * *